United States Patent [19]
Wagner et al.

[11] Patent Number: 6,119,866
[45] Date of Patent: Sep. 19, 2000

[54] PROCESS AND DEVICE FOR SEPARATION OF WANTED MATERIALS FROM PRODUCT MIXES WHICH CONTAIN FLOATING/ ABSORBENT MATERIAL AND METALS WITH A FERROMAGNETIC CONTENT

[75] Inventors: Josef Wagner, Ingolstadt; Siegfried Kreibe, Munich; Bernhard Hartleitner, Mering; Thorsten Pitschke, Welden; Xaver Deisser, Ehingen, all of Germany

[73] Assignee: Hewlett-Packard Company, Fort Collins, Colo.

[21] Appl. No.: 09/354,445

[22] Filed: Jul. 15, 1999

[30] Foreign Application Priority Data

Jul. 15, 1998 [EP] European Pat. Off. ............. 98113174

[51] Int. Cl.[7] ........................................ B03B 7/00
[52] U.S. Cl. ............................. 209/12.1; 209/3; 209/10; 209/13; 241/24.12; 241/24.13; 241/24.14; 241/24.15; 241/24.18
[58] Field of Search .................................. 209/13, 38, 39, 209/40, 17, 18, 636, 3, 12.1, 10, 172, 173, 172.5; 241/20, 24.12, 24.13, 24.14, 24.15, 24.18, 27, 29, 79.1, 69, 38

[56] References Cited

U.S. PATENT DOCUMENTS

| | | | |
|---|---|---|---|
| 3,650,396 | 3/1972 | Gillespie et al. | 209/3 |
| 3,777,994 | 12/1973 | Fischer . | |
| 4,813,618 | 3/1989 | Cullom | 241/79.1 |
| 4,852,811 | 8/1989 | Adams et al. | 241/1 |
| 4,981,876 | 1/1991 | Grimmer . | |
| 5,011,087 | 4/1991 | Richardson et al. | 241/5 |
| 5,653,867 | 8/1997 | Jody et al. | 209/164 |

FOREIGN PATENT DOCUMENTS

| | | |
|---|---|---|
| 0429031A2 | 11/1990 | European Pat. Off. . |
| 3347230A1 | 12/1983 | Germany . |
| 19521413A | 6/1995 | Germany . |

Primary Examiner—Donald P. Walsh
Assistant Examiner—Jonathan R. Miller

[57] ABSTRACT

Process and device for separation of wanted materials from product mixes which contain floating/absorbent material and metals having a ferromagnetic content, particularly from ink cartridges by means of the following steps: coarsely comminuting the product mix, separating the floating/absorbent material from the coarse fraction by means of float/sink separation, and separating metals having a ferromagnetic content from the sinking fraction by means of magnetic separation.

18 Claims, 2 Drawing Sheets

PROCESS AND DEVICE FOR SEPARATION OF WANTED MATERIALS FROM PRODUCT MIXES WHICH CONTAIN FLOATING/ ABSORBENT MATERIAL AND METALS WITH A FERROMAGNETIC CONTENT

FIELD OF THE INVENTION

The invention relates to a process for separation of wanted materials from product mixes which contain floating/absorbent materials and metals with a ferromagnetic content, particularly from ink cartridges and a device for implementation of the process.

BACKGROUND OF THE ART

Ink cartridges are currently used as disposable cartridges in printers, fax machines etc., and arise in large quantities in the form of waste once their capacity of ink has been consumed. An ink cartridge of this type contains a wide range of various materials and mainly consists of a plastic casing, an absorbent/floating, readily deformable plastic foam material within the casing, an ink jet and a circuit with electrical contacts, in which context virtually all of the components still retain a residue of ink once the ink capacity of the cartridge has been consumed. The absorbent foam-type material consists of polyurethane or a similar material and its function is to absorb the ink and to stabilise it within the cartridge in order to prevent sloshing of the ink when the ink cartridge is moved at high speed together with the print head inside the printer. In particular, this plastic foam material still retains a relatively high proportion of ink even after the ink cartridge is spent. The casing of the ink cartridge consists of plastic, e.g. polysulfonate. The ink jet contains a noble metal, e.g. gold.

This noble metal is found on a nickel coating. And furthermore the circuit printed on a board for control of the ink cartridge contains noble metal, e.g. gold. The ink cartridge also contains proportions of pure steel, as in the casing walls, for example.

On this basis, the objective of this invention is to produce a process and a device for separation of wanted materials from product mixes, which contain floating/absorbent material, plastics and metals with a ferromagnetic content, in which context the wanted materials are reliably and completely separated.

SUMMARY OF THE INVENTION

The invention achieves this objective by a process having the characteristics of claim 1 and by a device having the characteristics of claim 10.

An advantageous result of these measures is that coarse comminution initially breaks up the mechanical links between various materials, and particularly those between floating and absorbent material and the remainder of the product mix, and that these materials are at least partially released. Furthermore, since the floating/absorbent material is largely released in a disconnected form, it is possible in the course of the subsequent float/sink separation to separate as a floating fraction that floating material which exhibits a relatively low density. At the same time, at least a proportion of the liquid adhering to the sinking fraction is washed away by immersion in the separating liquid of the float/sink separator.

Advantageous configurations and useful further developments of the main principles are described in the subsidiary claims. A particularly advantageous configuration can be achieved in the case of processing of ink cartridges by magnetic separation in conjunction with a largely pure steel fraction and a steel fraction containing noble metal, for separation from nonferromagnetic material. For separation of the pure steel fraction from the steel fraction containing noble metal, the separated ferromagnetic material is subsequently filtered, in which process fine-grained particles constitute the steel fraction containing noble metal and the coarse-grained particles constitute the steel fraction which is free of noble metal.

A further particularly advantageous configuration can be achieved where, as a preliminary process for already comminuted material for float/sink separation, a proportion of any liquid attaching to it can be separated, for example by means of a vibrating filter. By this means, it is also possible to render that absorbent material which is largely saturated with liquid adequately buoyant for a downstream float/sink separation where the separating medium is water. Where water is utilised as the separating medium, it is possible to exploit the advantages of its ready availability, ease of handling in the process and its low costs as a contribution to the cost-effectiveness of the process as per the invention.

As materials separated by the process as per the invention and/or by the device as per the invention, there are obtained a coarsely comminuted non-ferromagnetic fraction, coarsely comminuted floating and absorbent material and a coarsely comminuted ferromagnetic fraction.

BRIEF DESCRIPTION OF THE DRAWINGS

Further advantageous configurations and useful further developments of the main principles are described in the remaining subsidiary claims, and their details can be taken from the specimen description shown below, by consulting the drawings.

The drawings illustrate.

DETAILED DESCRIPTION OF THE PREFERRED EMBODIMENT

Figure 1:
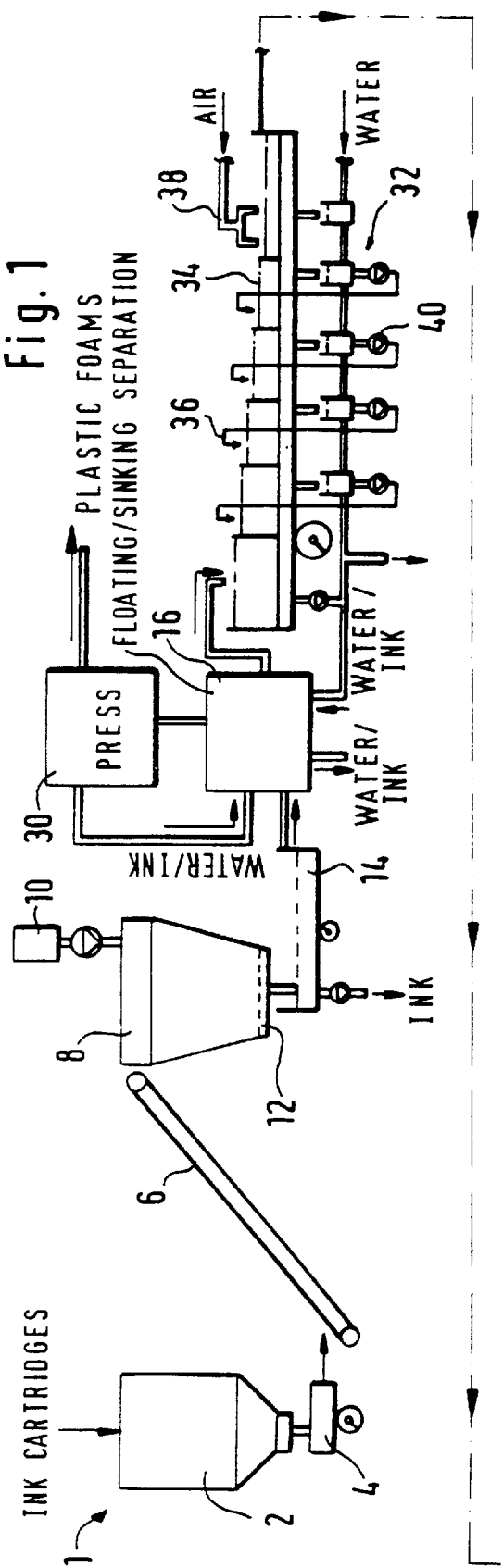
FIG. 1 a diagrammatic view of the device as per the invention in an ideal specification.
Figure 1:
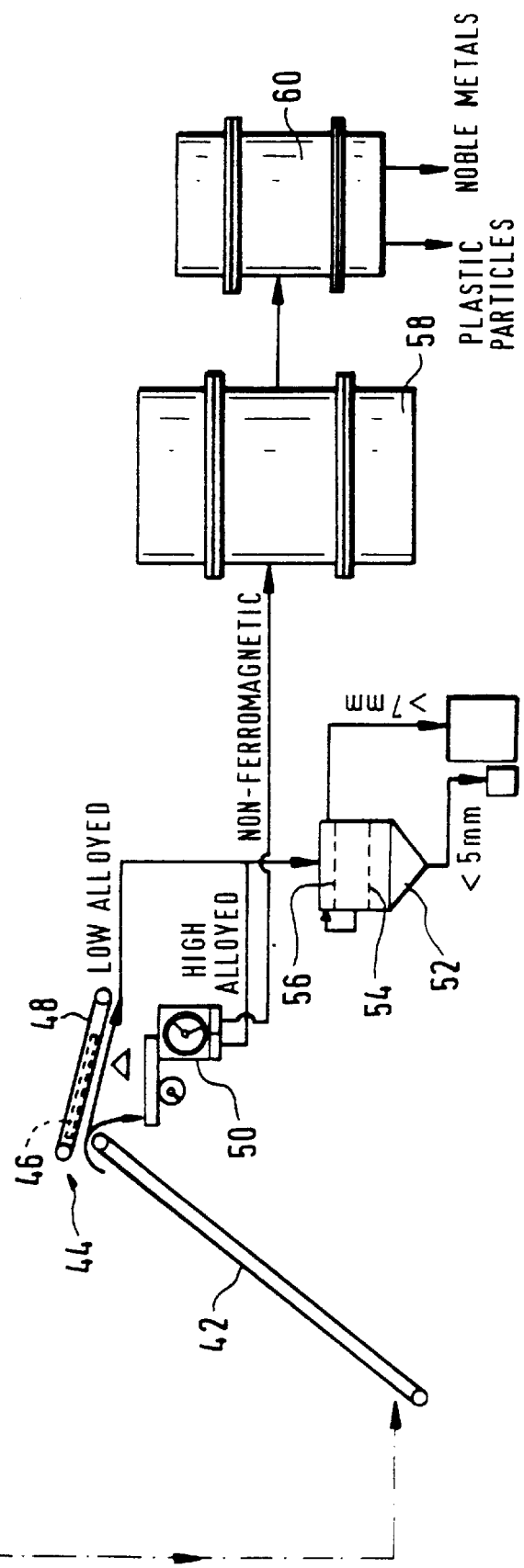

The device illustrated in FIG. 1 is ideally employed for separation of wanted materials from ink cartridges 1. Device 1 exhibits a hopper-form storage tank 2 for storage of spent and empty ink cartridges. At the hopper-form outlet of storage tank 2 there is arranged a vibration feed device 4 by means of which the ink cartridges are transported via a conveyor belt 6 to a grinder 8 which is ideally a single-shaft grinder. Within grinder 8 the ink cartridges are coarsely comminuted, in which context by means of a feed device 10 an anti-foaming emulsion is fed to grinder 8 in order to prevent foaming during grinding. The coarsely comminuted ink cartridges then drop onto a filter 12 with filter apertures of (ideally) 20 mm which is arranged at the outlet aperture of grinder 8 and upon which coarse particles will remain until they have been adequately comminuted and through which they will drop onto an initial vibrating filter 14, as a fine product, coarsely comminuted ink cartridge particles. The function of the initial vibrating filter 14 is to allow a proportion of the ink attaching to the ink cartridge particles to drain off, in which context the comminuted ink cartridges remain as a coarse fraction on the filter of initial vibrating filter 14.

Figure 2:
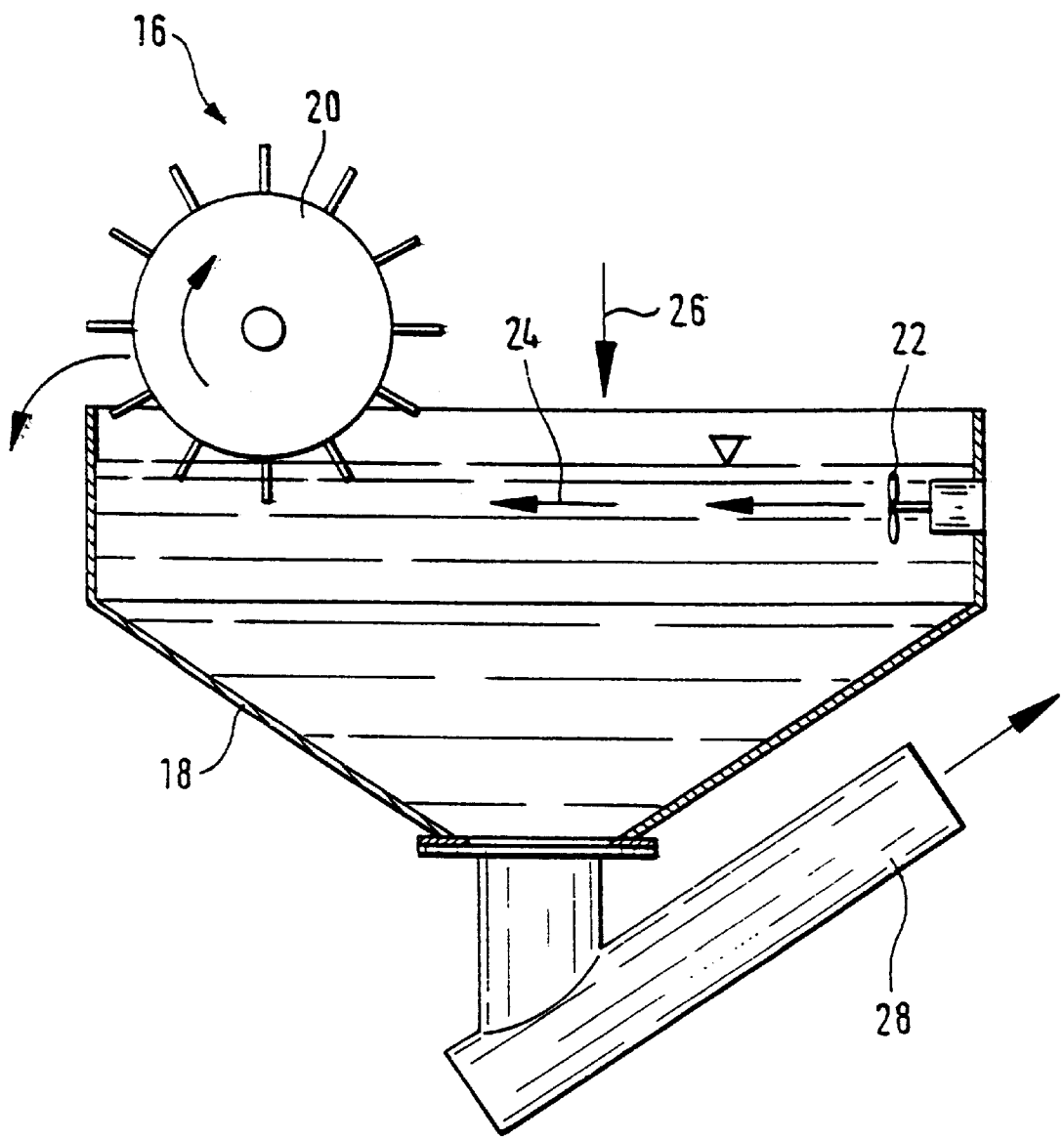
FIG. 2 a diagrammatic view of a float/sink separator as part of the device as per the invention.

The coarse fraction is transported to a float/sink separator 16 of which there is a diagrammatic illustration in FIG. 2, exhibiting a hopper-form separator tank 18 in which water is ideally stored as the separating medium. Furthermore, float/sink separator 16 possesses a rake wheel 20 which is partially immersed in the water and which is rotary-driven, for extraction of the floating fraction, and motor-driven propellers 22 for generation of a surface flow 24 in the direction of rake wheel 20. If the coarsely comminuted ink cartridges, which contain amongst other items floating plastic foam materials and heavier plastic particles of the ink cartridges, are brought to a pickup point 26 on the surface of the water, then the heavier ink cartridge particles will sink as a sinking fraction to the bottom of separator tank 18, where they will be transported onwards in a screw conveyor 28. During sinking, the ink cartridge particles will give up a further proportion of the ink adhering to them to the water, such that there is also simultaneous cleaning of the ink cartridge particles in separator tank 18, in addition to their separation.

The surface flow 24 which is generated by the propellers is set such that the plastic foam materials floating on the surface of the water promptly become propelled towards rake wheel 20 before they can become saturated with water and consequently sink. Surface flow 24 is ideally generated only in the upper levels of the separating medium such that the heavier plastic particles can sink as rapidly and smoothly as possible. The rapid outflow of plastic foam materials towards rake wheel 20 prevents a situation in which the surface of the water would be covered with floating plastic foam materials and would prevent the sinking of heavier incoming ink cartridge particles. On the other hand, surface flow 24 should not be too powerful, in the interests of preventing the heavier sinking fraction from being expelled. Depending on the type of plastic foam material, it is possible to employ a separating medium other than water, and in particular to vary the density and flow speed of the separating medium in order to prevent saturation and sinking of the plastic foam material. The plastic foam materials being driven towards rotating rake wheel 20 are transported from the rakes into an extraction tank (which is not illustrated).

The partial draining of ink from out of the plastic foam materials on initial vibration filter 14, preceding the float/sink separation stage, achieves a situation in which plastic foam materials which are extensively saturated with ink can also be rendered buoyant for float/sink separation using water as the separating medium, because otherwise they would sink due to the higher density of ink in relation to water. For that reason, it is advantageous to envisage this step in cases where there is still a relatively large quantity of ink in the plastic foam materials.

From float/sink separator 16, the separated plastic foam materials are transported to a press 30 where the residual ink which they have absorbed and any water which may have been absorbed during float/sink separation is squeezed out of them. Next, the squeezed plastic foam materials will be incinerated. The drained water/link mix is pumped back into separator tank 18 of float/sink separator 16 where it is used as a further washing liquid for the sinking fraction.

The sinking fraction which has been separated from float/sink separator 16 is fed to a second vibrating filter 32 in which the particles on filter bottoms 34 which are arranged consecutively in stages along the second vibrating filter 32 can be brought into vibration, in which context a proportion of the ink adhering to them is shaken off. At the same time, the ink cartridge particles, on their way along second vibrating filter 32 from the top filter layer to the bottom filter layer will be washed with water-flowing out of washing nozzles 36 which are arranged above filter bottoms 34—to clean off the ink. Depending on the desired degree of completion of removal of ink, a proportion of the water is set into circulation. Finally, the washed ink cartridge particles are dried by air nozzles 38 on the topmost and the final filter bottom levels. A proportion of the water/ink mix which has been collected below second vibrating filter 32 is transported by pumps 40 back into separator tank 18 of float/sink separator 16, where it is used as a further washing liquid.

The ink cartridge particles which have been washed and dried and which are present as coarse products on the lowest filter bottom of second vibrating filter 32 reach, via a rising conveyor belt 42, a magnetic separator 44 in which the ferromagnetic contents of the ink cartridge particles are separated. Magnetic separator 44 ideally contains an upper magnetic separator belt 46 in an overhead arrangement which is located above the ejection end of conveyor belt 42 and which draws low alloy-content ferromagnetic material out of the ejected ink cartridge particles onto its extractor belt 48, from which it is transported onwards. High alloy-content ferromagnetic material which is not picked up by upper magnetic separator belt 46, and any non-ferromagnetic material, will be transported into a magnetic drum separator 50 which ideally exhibits a neodymium magnet with a powerful magnetic field. The powerful magnetic force of the neodymium magnet also makes it possible to separate high alloy-content ferromagnetic particles from non-ferromagnetic particles.

High and low alloy-content ferromagnetic partides separated by magnetic separator 44 are fed to a filter device 52 which exhibits filters 54 with filter apertures of (ideally) 5 mm and filters 56 with filter apertures of (ideally)7mm. Through filters 54 with filter apertures of 5 mm diameter, there drop fine-grained ferromagnetic particles such as the ink jets, which exhibit the highest proportion of gold or palladium, on a nickel coating. Particles having a size of more than 7 mm have no proportion, or a very low proportion of noble metal and will remain as a coarse product on filters 56 with the 7 mm filter apertures. Particles of a size between 5 and 7 mm are transported as interim fractions to the pickup point of the filter machine for repeated filtering, since they normally still contain a proportion of 10–15% of ferromagnetic particles containing noble metal which have not yet been filtered out during the first filtering process. At the output of filter device 52, as a result of filtration, fine-grained ink cartridge particles containing noble metal and coarse-grained ferromagnetic particles not containing noble metals, will be stored separate from each other in corresponding containers. It is clear that the size of the filter apertures can be varied by the specialist in order to adapt them to the size and type of the ferromagnetic particles for separation.

The non-ferromagnetic fraction which is separated by magnetic separator 44 contains not only plastic particles but also bonded backing foils with circuit tracks containing gold. This fraction is passed to an air swirl grinder 58 in which grinding air is set into a high-energy turbulent flow by means of a rotor driven at high speed in conjunction with stationary grinding tracks. The non-ferromagnetic fraction is passed into the air flow as grinding products and will be located, throughout its period in the grinder, in the comminution gap between the rotor and the stationary grinding track. In this context, at extremely short intervals of time, both the direction and the speed of the particles suspended in the airflow will be varied, with the result that the particles collide with high energy and are thus smoothly and selectively comminuted and dried. As a particularly advantageous effect with regard to the re-cycling of wanted materials in ink cartridges, at the same time, the friction, collision and shear loads arising due to particle collisions will separate the backing foils from the circuit tracks containing gold from the circuit boards. The air swirl grinder also ideally exhibits a metal detector in order to prevent any as yet unseparated steel particles from damaging the air swirl grinder. Tests performed by the applicant have indicated that further processing of the finely comminuted particles in a second, smaller air swirl grinder 60 makes it possible to separate the circuits containing gold from their backing foils. As the result of processing in air swirl grinders 58, 60, finely comminuted dried and separated particles are obtained, which contain plastics and a further fraction of gold.

What is claimed is:

1. Process for separation of wanted materials from product mixes obtained from ink cartridges which product mix contain floating/absorbent material and metals with a ferromagnetic content, said process comprising the following steps:

coarsely comminuting the ink cartridges to a comminuted product mix;

separating floating/absorbent material from a coarse fraction by means of float/sink separation; and separating metals with a ferromagnetic component from a sinking fraction by means of magnetic separation.

2. Process as per claim 1, wherein after said coarsely comminuting and before said float/sink separation, any liquid which may adhere to the coarse fraction is separated from floating/absorbent material.

3. Process as per claim 1, wherein an anti-foaming agent is fed in during the coarsely comminuting of the product mix.

4. Process according to claim 1, wherein the floating/absorbent material is transported from a pickup point to an output point of a float/sink separator at such a speed that the floating/absorbent material is substantially unable to pick up liquid separating medium.

5. Process as per claim 4, wherein any liquid adhering to the sinking fraction is washed off and the washed-off sinking fraction is subsequently dried.

6. Process as per claim 1, wherein the separated metals with a ferromagnetic component are filtered such that a fine-grained steel fraction which is rich in noble metal and a coarse-grained steel fraction which is largely free of any noble metal are separated.

7. Process as per claim 6, wherein the metals with a ferromagnetic component which have been separated from the sinking fraction are filtered such that a steel fraction largely free of noble metal and having particle sizes of more than 7 mm and a steel fraction containing noble metal and having particles sizes of less than 5 mm are kept separate from each other.

8. Process as per claims 1, wherein in remaining non-ferromagnetic material, the sinking fraction is simultaneously subjected to the following steps in one or several air swirl grinders:

comminuting, drying and separating of agglomerated material.

9. Process as per claim 8, wherein the steps of claim 8 are repeated.

10. Device for implementation of the process as per claim 1, said device comprising:

a coarse comminution device for coarse comminution of the ink cartridges to a coarsely comminuted product mix;

a float/sink separator for separation of the coarsely comminuted product mix into a sinking fraction and a floating fraction containing floating and absorbent material; and a magnetic separator which allows the separation of metals having a ferromagnetic content from the sinking fraction.

11. Device as per claim 10, wherein between the coarse comminution device and the float/sink separator there is positioned an initial vibrating filter for draining of any liquid adhering to the coarse fraction.

12. Device as per claim 10, wherein the coarse comminution device comprises a grinder with a device for feeding in anti-foaming agents.

13. Device as per claim 10, wherein the float/sink separator contains a liquid separating medium and includes means for transportation of the floating/absorbent material floating on the separating medium from a pickup point to an output point and transports the floating/absorbent material along the surface of the separating medium at such a speed that the floating/absorbent material is substantially unable to pick up liquid separating medium.

14. Device as per claim 10, further comprising a second vibrating filter with washing nozzles for washing of liquid from the sinking fraction, and air nozzles for subsequent drying of washed sinking fraction.

15. Device as per claim 10, wherein the product mix contains ink cartridges and the Device further comprises a filter device for filtration of separated metals with a ferromagnetic content in order to achieve a fine-grained steel fraction which is rich in noble metal and a coarse-grained steel fraction which is largely free of noble metal.

16. Device as per claim 15, wherein the filter device includes filters with filter apertures of about 5 mm and filters with filter apertures of about 7 mm in order to keep separate a steel fraction with particle sizes of more than 7 mm, largely free of noble metals, and a steel fraction with particle sizes of less than 5 mm, containing noble metal.

17. Device as per claim 10, wherein the Device further comprises at least one air swirl grinder for processing of non-ferromagnetic material to simultaneously comminute it, dry it and separate agglomerated material.

18. Device for implementation of the process as per claim 1, said device comprising:

a coarse comminution device for coarse comminution of the product mix;

a float/sink separator for separation of the coarsely comminuted product mix into a sinking fraction and a floating fraction containing floating and absorbent material;

a magnetic separator which allows the separation of metals having a ferromagnetic content from the sinking fraction; and a separator for separating from the separated metals having a ferromagnetic content (a) a fine-grained steel fraction which is rich in noble metals and (b) a coarse-grained steel fraction which is largely free of any noble metal.

* * * * *